United States Patent
Dong (10) Patent No.: US 12,250,077 B2
(45) Date of Patent: Mar. 11, 2025

(54) METHOD AND APPARATUS FOR CONTROLLING BLOCK ACKNOWLEDGEMENT FEEDBACK

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 320 days.

(21) Appl. No.: 17/784,574

(22) PCT Filed: Dec. 12, 2019

(86) PCT No.: PCT/CN2019/124808
§ 371 (c)(1),
(2) Date: Jun. 10, 2022

(87) PCT Pub. No.: WO2021/114168
PCT Pub. Date: Jun. 17, 2021

(65) Prior Publication Data
US 2023/0006773 A1    Jan. 5, 2023

(51) Int. Cl.
*H04L 1/16* (2023.01)
*H04L 1/08* (2006.01)
*H04L 1/1607* (2023.01)

(52) U.S. Cl.
CPC .............. *H04L 1/1621* (2013.01); *H04L 1/08* (2013.01)

(58) Field of Classification Search
CPC ................................ H04L 1/1621; H04L 1/08
See application file for complete search history.

(56) References Cited

U.S. PATENT DOCUMENTS

| | | | |
|---|---|---|---|
| 8,223,647 B2 | 7/2012 | Kakani et al. | |
| 2005/0265302 A1* | 12/2005 | Nishibayashi | H04L 45/00 370/349 |
| 2009/0292965 A1* | 11/2009 | Park | H04L 69/324 714/750 |
| 2011/0096710 A1* | 4/2011 | Liu | H04L 1/1614 370/312 |
| 2011/0116435 A1* | 5/2011 | Liu | H04L 12/189 370/312 |

(Continued)

FOREIGN PATENT DOCUMENTS

| | | |
|---|---|---|
| CN | 106506125 A | 3/2017 |
| CN | 107547175 A | 1/2018 |
| WO | WO 2010005639 A2 | 1/2010 |

OTHER PUBLICATIONS

European Patent Application No. 19955846.1, Search and Opinion dated Mar. 27, 2023, 9 pages.

(Continued)

*Primary Examiner* — Zhiren Qin
(74) *Attorney, Agent, or Firm* — Cozen O'Connor (57) ABSTRACT

A method for controlling block acknowledgement feedback includes: for multiple transmission links for transmitting continuous data frames, sending a block acknowledgement feedback control identifier from a first communication device to a second communication device. The block acknowledgement feedback control identifier is configured to indicate an enabled or disenabled state of block confirmation feedback of the transmission link.

17 Claims, 5 Drawing Sheets

(56) References Cited

U.S. PATENT DOCUMENTS

| | | | |
|---|---|---|---|
| 2014/0023020 A1* | 1/2014 | Yang | H04L 1/1671 370/329 |
| 2014/0140197 A1* | 5/2014 | Sadeghi | H04L 69/28 370/216 |
| 2017/0006608 A1* | 1/2017 | Josiam | H04L 5/001 |
| 2017/0055300 A1 | 2/2017 | Pitchaiah | |
| 2018/0041917 A1* | 2/2018 | Xi | H04L 1/1854 |
| 2018/0332502 A1* | 11/2018 | Chu | H04L 1/1671 |
| 2019/0082373 A1 | 3/2019 | Patil et al. | |
| 2019/0254017 A1 | 8/2019 | Wengerter et al. | |
| 2020/0052832 A1* | 2/2020 | Tian | H04L 1/1614 |
| 2020/0267636 A1* | 8/2020 | Cavalcanti | H04W 16/10 |
| 2022/0014311 A1* | 1/2022 | Chitrakar | H04L 5/0055 |

OTHER PUBLICATIONS

Indian Patent Application No. 202247039858, Office Action dated Oct. 18, 2022, 5 pages.
PCT/CN2019/124808 English translation of International Search Report dated Aug. 28, 2020, 2 pages.
Indian patent application No. 202247039858, Office Action dated Jan. 8, 2025, 2 pages.

\* cited by examiner

METHOD AND APPARATUS FOR CONTROLLING BLOCK ACKNOWLEDGEMENT FEEDBACK

CROSS-REFERENCE TO RELATED APPLICATION

This application is the US national phase application of International Application No. PCT/CN2019/124808, filed on Dec. 12, 2019, the entire contents of which are incorporated herein by reference for all purposes.

TECHNICAL FIELD

The disclosure relates to, but is not limited to the field of wireless communication technologies, and in particular to a method for controlling block acknowledgment feedback, an apparatus for controlling block acknowledgment feedback, a communication device, and a storage medium.

BACKGROUND

The Institute of Electrical and Electronics Engineers constituted a study group (SG) to study next-generation mainstream Wi-Fi technologies, i.e., IEEE802.11be standard. The research scope is: Wi-Fi transmission supporting 320 MHz bandwidth at most, aggregation and coordination technology using multiple frequency bands. The speed and throughput proposed in the vision has been increased to at least four times compared to that of the existing IEEE802.11ax. The main application scenarios of the new technology include video transmission, augmented reality (AR), and virtual reality (VR).

The aggregation and coordination technology using multiple frequency bands refers to simultaneous communication among Wi-Fi devices in different frequency bands such as 2.4 GHz, 5.8 GHz, and 6-7 GH, or at different bandwidths in the same frequency band.

For multiple data frames that are continuously sent in different transmission links, a block acknowledgment (BA, Block ACK) method is used to feedback reception of the data frames.

SUMMARY

Embodiments of a first aspect of the disclosure provide a method for controlling BA feedback, performed by a first communication device. The method includes:

for a plurality of transmission links that transmit continuous data frames, sending a block acknowledgement feedback control identifier, in which the block acknowledgement feedback control identifier is configured to indicate an enabled or disenabled state of BA feedback of each transmission link.

Embodiments of a second aspect of the disclosure provide a method for controlling BA feedback, performed by a second communication device. The method includes:

receiving a block acknowledgement feedback control identifier for a plurality of transmission links that transmit continuous data frames; and enabling or disenabling BA feedback for the transmission link according to indication of the block acknowledgement feedback control identifier.

Embodiments of a third aspect of the disclosure provide a communication device including a processor, a transceiver, a memory, and executable programs stored on the memory and capable of being executed by the processor. When the processor runs the executable programs, steps of the method for controlling BA feedback according to the first aspect or the second aspect of the disclosure are implemented.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the instruction information may also be referred to as the second information, and similarly, the second information may also be referred to as the instruction information. Depending on the context, the word "if" as used herein can be interpreted as "when", "while" or "in response to determining".

The executive bodies involved in embodiments of the disclosure include but are not limited to communication devices under wireless communication network standards, especially Wi-Fi network standards, such as IEEE802.11a/b/g/n/ac standard, and next generation Wi-Fi network standards, such as IEEE802.11be standard. The communication devices include but are not limited to: Wi-Fi routers and other wireless access point (AP) devices, wireless stations (STA), user terminals, user nodes, mobile terminals or tablet computers.

In an application scenario of the embodiments of the disclosure, before transmitting data frames, a data frame originator and a data frame recipient can negotiate a BA feedback mechanism. After continuously receiving a certain number of data frames, the data fame receiving end feeds back BA, and when no more continuous data frames are sent, the BA mechanism can be disenabled.

Figure 1:
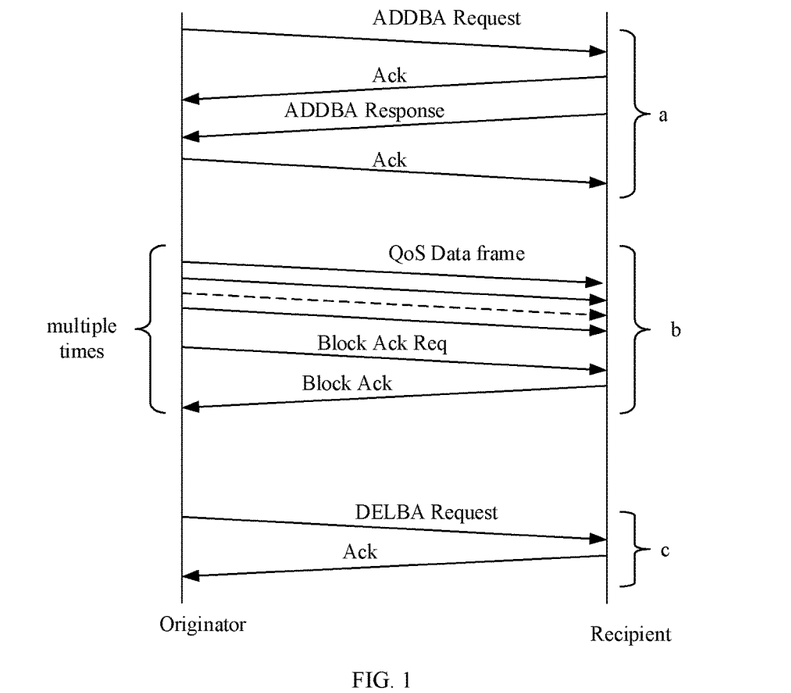
FIG. 1 is a schematic diagram of a single transmission link BA feedback interaction according to an exemplary embodiment.

A single transmission link BA feedback mechanism as shown in FIG. 1 includes the following steps.

Step a, BA feedback mechanism establishment. Before transmitting the data frames, the data frame originator and the data frame recipient can negotiate the BA mechanism. The data frame originator sends a BA feedback establishment request, ADDBA request, and the data frame recipient sends a BA feedback establishment response, ADDBA response.

Step b, data frame transmission and feedback. The data frame originator transmits multiple data frames conforming to a Quality of Service (QoS) via multiple transmission links, and after transmission of the data frames is completed, receives BA that reflects reception of the multiple data frames sent by the data frame recipient.

Step c, BA feedback mechanism disenabled. After continuous transmission of the data frames is completed, the data frame originator sends a BA feedback disenabled request, DELBA request, to disenable the BA feedback.

The BA feedback disenabled process is applicable to single transmission link, and can be used to disenable the BA feedback for one transmission link, but cannot disenable the BA feedback for multiple transmission links. The transmission links that are not disenabled remain active, which is not conducive to saving power.

If BA feedback disenabled is initiated under each transmission link, the power consumption is greater than that of BA feedback disenabled process for one transmission link.

If BA feedback disenabled frames for multiple transmission links are initiated under one transmission link, considering that Wi-Fi uses the contention-based access mechanism and there may be hidden nodes, the transmission of multiple disenable frames may lead to a high probability of communication collision, which may cause retransmission, and thus is not conducive to saving power and reduces spectrum utilization.

Figure 2:
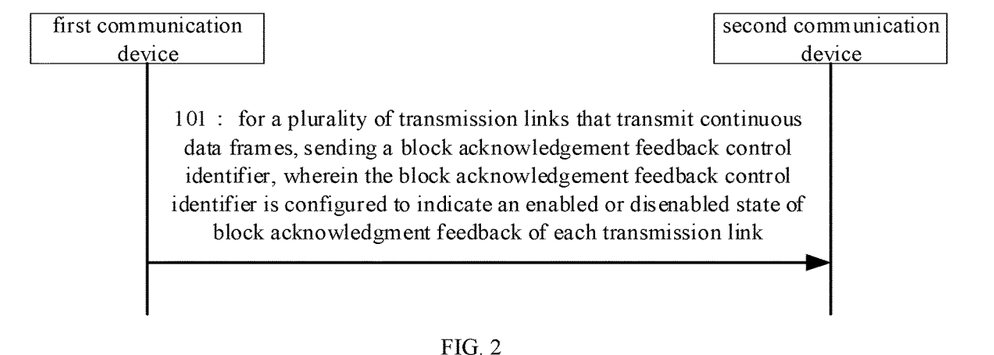
FIG. 2 is a flowchart of a method for controlling BA feedback according to an exemplary embodiment.

As illustrated in FIG. 2, this example embodiment provides a method for controlling BA feedback, which can be applied to a first communication device in wireless communication. The method includes the following steps.

In step 101, for a plurality of transmission links that transmit continuous data frames, a block acknowledgement feedback control identifier is sent, in which the block acknowledgement feedback control identifier is configured to indicate an enabled or disenabled state of BA feedback of each transmission link.

Wireless communication may be Wi-Fi communication of IEEE802.11be standard. The first wireless communication device may be an originator for continuous data frame in the Wi-Fi communication technology, and the second wireless communication device may be a recipient for the continuous data frame in the Wi-Fi communication technology. The first communication device may communicate with the second communication device over multiple transmission links.

The continuous data frames may include multiple data frames transmitted over multiple transmission links. Each transmission link of the multiple transmission links occupies one transmission frequency band, and the multiple transmission links occupy multiple transmission frequency bands. The transmission frequency band may be any of multiple Wi-Fi working frequency bands, such as 2.4 GHz, 5.8 GHz, and 6-7 GHz. The bandwidths occupied by multiple transmission links in the same frequency band may be the same or different. For example, the bandwidths occupied by the multiple transmission links may be one or more of 20 MHz, 40 MHz, and 80 MHz. The frequency ranges of the bandwidths occupied by respective transmission frequency bands may belong to the same Wi-Fi working frequency band, or may belong to different Wi-Fi working frequency bands.

The first communication device may send the BA feedback control identifier by carrying the BA feedback control identifier in a management frame, or may send the BA feedback control identifier by sending an instruction. Here, the BA feedback control identifier may be configured to indicate an enabled or disenabled state of BA feedbacks of the transmission links after transmission of the data frames.

Figure 3:
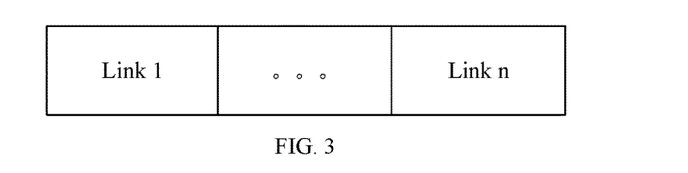
FIG. 3 is a schematic diagram of a BA feedback control identifier according to an exemplary embodiment.

As illustrated in FIG. 3, a control identifier can be set in the BA feedback control identifier for each transmission link, and each control identifier corresponds to one transmission link. Here, the transmission link may be any of multiple transmission links for continuous data frames. Link 1 in FIG. 3 represents the control identifier for one transmission link, which is configured to indicate an enabled or disenabled state of BA feedback of the transmission link.

The control identifiers for respective transmission links shown in FIG. 3 may be arranged according to frequency bands of the respective transmission links. For example, Link 1 to Link n may be arranged according to the frequency bands for the corresponding transmission links from high to low, or may be arranged according to the frequency bands for the corresponding transmission links from low to high.

The control identifier for each transmission link in the BA feedback control identifier may occupy one subfield in the BA feedback control identifier, and each subfield may occupy 1 bit, in which "1" or "0" are used to indicate an enabled or disenabled state of the BA feedback for the transmission link. For example, "1" may be used to indicate that the BA feedback for the transmission link is enabled, and "0" may be used to indicate that the BA feedback for the transmission link is disenabled. Alternatively, "0" may be used to indicate that the BA feedback for the transmission link is enabled, and "1" may be used to indicate that the BA feedback for the transmission link is disenabled.

After receiving the message frames, the second communication device may determine the an enabled or disenabled state of each transmission link indicated by the first communication device according to the control identifier. The BA feedback is disenabled for the transmission link that is indicated to be disenabled, and the BA feedback is enabled for the transmission link that is indicated to be enabled.

After completing transmission of the continuous data frames, the first communication device may determine the reception of the data frame over each transmission link according to the BA feedback by the second communication device. The first communication device may send the BA feedback control identifier after receiving the BA. For the transmission link that completes data frame transmission and does not require retransmission, the first communication device may disenable the BA feedback for the transmission link, that is, set the control identifier for the transmission link to disenabled. For the transmission link that completes the data frame transmission but needs to retransmit the data frames, the first communication device may maintain the BA feedback for the transmission link, that is, set the control identifier for the transmission link to enable. The first communication device may also send the message frame after retransmission of all the transmission links is completed, and set the BA feedbacks for the transmission links for transmitting the data frames to disenabled.

In this way, on one hand, with the BA feedback control identifier, the BA feedback for each transmission link is controlled to enabled or disenabled, and the BA feedback of multiple transmission links whose data transmission is completed can be disenabled, to disenable the active states of the multiple transmission links, thereby reducing the power consumption of the communication device. On the other hand, the enabled or disenabled state of BA feedbacks for multiple transmission links is realized through one BA feedback control identifier, which reduces the communication conflict problem caused by sending a BA feedback disenabled frame separately for each transmission link, and reduces retransmission of the BA feedback disenabled frame, thereby reducing power consumption caused by retransmission.

In an embodiment, the BA feedback control identifier further includes:

first identification information configured to indicate a data frame sequence number of the continuous data frames.

The first communication device may transmit multiple sequences of continuous data frames, and after completing the transmission of one sequence of continuous data frames, the first communication device may control the BA feedbacks for the transmission links of the sequence of continuous data frames.

Figure 4:
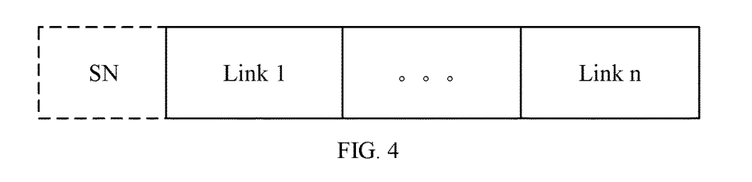
FIG. 4 is a schematic diagram of another BA feedback control identifier according to an exemplary embodiment.

The first communication device may set the first identification information in the BA feedback control identifier to instruct the second communication device to enable or disenable the transmission links of the confirmed continuous data frames. As illustrated in FIG. 4, the first identification information may be a sequence number (SN) of the continuous data frames, that is, an identifier of the continuous data frames. The sequence number of continuous data frames can uniquely identify one sequence of continuous data frames.

The second communication device determines, according to the first identification information, the BA feedbacks of the continuous data frames that need to be enabled or disenabled. The BA feedback for each transmission link of the continuous data frames is enabled or disenabled according to the control identifier.

In this way, the BA feedbacks for controlling the transmission links can be controlled for different sequences of continuous data frames, and the accuracy of the BA feedback control is improved.

In an embodiment, the BA feedback control identifier further includes:

second identification information configured to indicate a traffic identifier (TID) of the continuous data frames.

Each sequence of continuous data frames may also have a unique TID. The first communication device may also set the TID in the message frame, to further indicate the continuous data frames for which the control identifiers indicate the second communication device to enable or disenable.

The second communication device can improve the identification accuracy of the continuous data frames according to the TID and SN.

Figure 5:
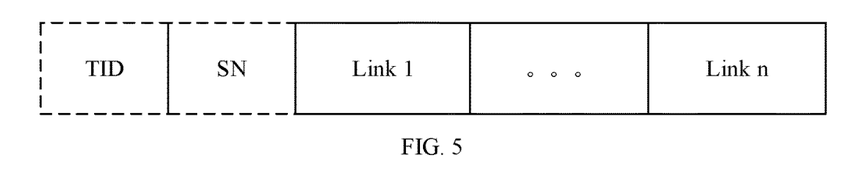
FIG. 5 is a schematic diagram of yet another BA feedback control identifier according to an exemplary embodiment.
Figure 6:
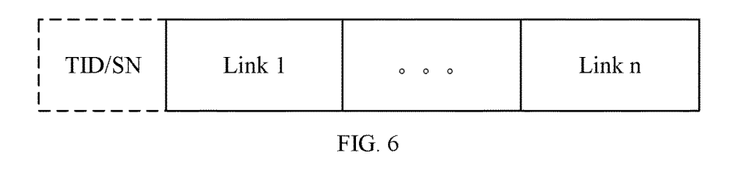
FIG. 6 is a schematic diagram of still another BA feedback control identifier according to an exemplary embodiment.

As illustrated in FIG. 5 and FIG. 6, TID and SN may be set in two subfields, or may be set in one subfield and jointly occupy the bit of the subfield.

In an embodiment, the BA feedback control identifier is configured to indicate maintaining an enabled state of the transmission link for an association management frame.

The association management frame may include an association request frame and an association response frame, and may also include a re-association request frame and a re-association response frame. The second communication device needs to associate with the first communication device when accessing the wireless network. Therefore, it is necessary to maintain the enabled state of the BA feedback for the transmission link for transmitting the association frame, so that the second communication device can associate with the first communication device.

In an embodiment, sending the BA feedback control identifier includes: sending a message frame carrying the BA feedback control identifier.

Here, the BA feedback control identifier may be carried in the message frame for transmission. The message frame may be a management frame, a control frame, or a data frame.

In an embodiment, sending the BA feedback control identifier includes: sending the last data frame of the continuous data frames carrying the BA feedback control identifier.

The last data frame of the continuous data frames may contain data content transmitted as normal, and may also contain the BA feedback control identifier. The last data frame of the continuous data frames may also contain only the BA feedback control identifier.

The BA feedback control identifier in the last data frame of the continuous data frames may be configured to indicate the transmission link whose BA feedback needs to be disenabled after the transmission of the continuous data frames is completed.

After receiving the last data frame of the continuous data frames, the second communication device may determine the transmission link whose BA feedback needs to be disenabled.

Here, the BA feedback for the transmission link that needs to transmit the association frame may remain enabled.

Figure 7:
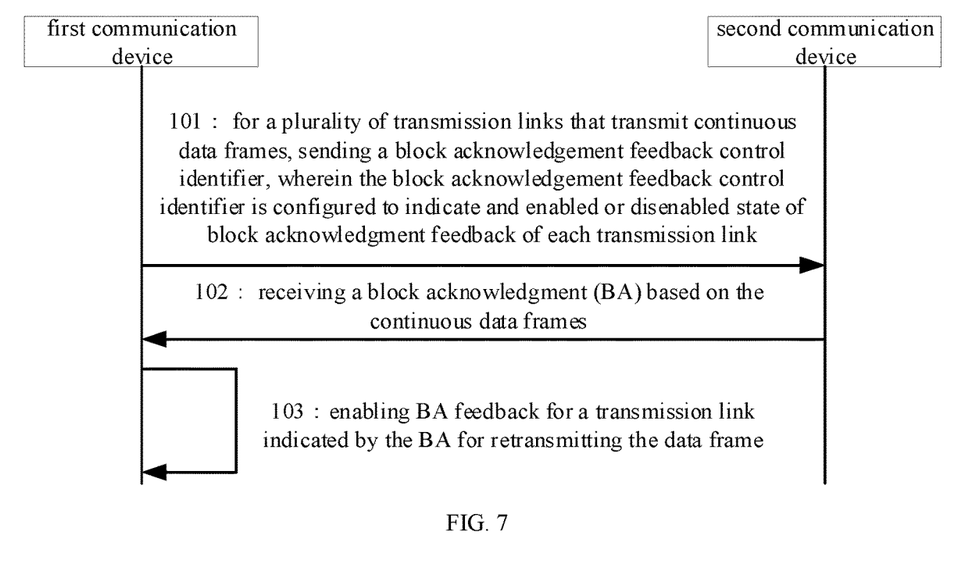
FIG. 7 is a flowchart of a method for controlling BA feedback according to an exemplary embodiment.

In an embodiment, as illustrated in FIG. 7, the method for controlling BA feedback further includes the following steps.

In step 102, a BA based on continuous data frames is received.

In step 103, BA feedback for a transmission link indicated by the BA for retransmitting the data frame is enabled.

After receiving the continuous data frames, the second communication device may determine the reception of each data frame in the continuous data frames, and send the BA to the first communication device according to the reception of each data frame. Based on the indication in the message frame, the BA feedback is disenabled, and the BA feedback is remained enabled for the transmission link that needs to perform data frame retransmission.

After receiving the BA, the first communication device may first determine the data frame that needs to be retransmitted and the transmission link for retransmitting the data frame, and disenable the transmission link that does not require data frame retransmission, and maintain enabled of the BA feedback for the transmission link that needs to perform data frame retransmission. In this way, the transmission link that performs retransmission can be provided with the ability to receive block reception feedback.

Here, the BA feedback can remain enabled for transmission link that needs to transmit the association frame.

In an embodiment, sending the last data frame of the continuous data frames carrying the block acknowledgment feedback control identifier includes:

in response to a number of initially transmitted frames of the continuous data frames being less than a number threshold, sending the last data frame of the continuous data frames carrying the block acknowledgment feedback control identifier.

Here, the number threshold may be determined according to historical transmission records of data frames. The first communication device may count the number of initially-transmitted data frame transmissions when the retransmitted data frame occurs for the first time in the historical transmissions, so as to estimate the number of data frame transmissions when no retransmission occurs under a predetermined probability. This number of data frame transmissions is determined as the number threshold.

When the number of initially-transmitted frames of the continuous data frames is less than the number threshold, the BA feedback control identifier is carried in the last data frame, which can reduce a situation that the transmission link indicated by the BA feedback control identifier to disenabled needs to retransmit the data frame, and improve the accuracy of indication of the BA feedback control identifier.

Figure 8:
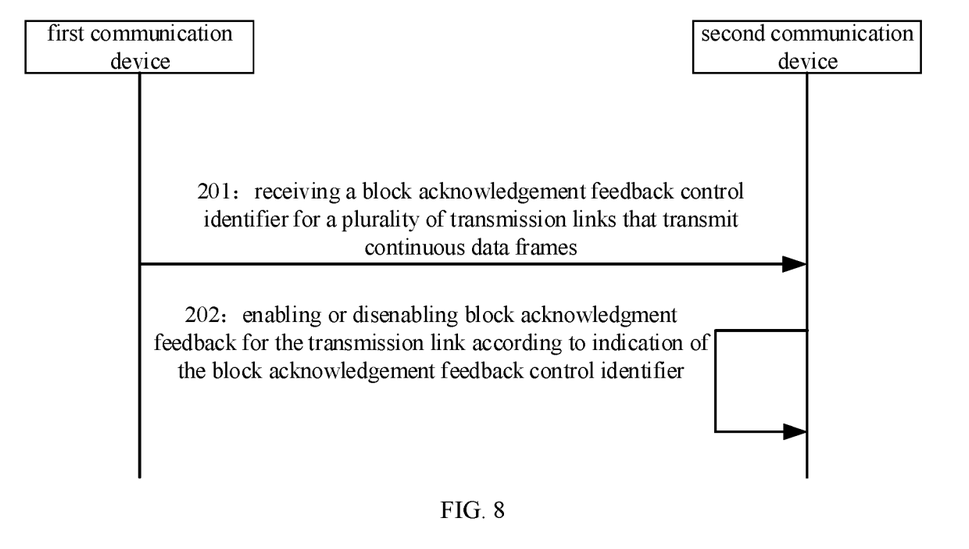
FIG. 8 is a flowchart of a method for controlling BA feedback according to an exemplary embodiment.

As illustrated in FIG. 8, this example embodiment provides a method for controlling BA feedback, which can be applied to a second communication device in wireless communication. The method includes the following steps.

In step 201, a BA feedback control identifier for a plurality of transmission links for transmitting continuous data frames is received.

In step 202, BA feedback for the transmission link is enabled or disenabled according to indication of the BA feedback control identifier.

Wireless communication may be Wi-Fi communication of IEEE802.11be standard. Here, the first wireless communication device may be an originator for continuous data frames in the Wi-Fi communication technology, and the second wireless communication device may be a recipient for the continuous data frames in the Wi-Fi communication technology. The first communication device may communicate with the second communication device over multiple transmission links.

The continuous data frames may include multiple data frames transmitted over multiple transmission links. Each transmission link of the multiple transmission links occupies one transmission frequency band, and the multiple transmission links occupy multiple transmission frequency bands. The transmission frequency band may be any of multiple Wi-Fi working frequency bands, such as 2.4 GHz, 5.8 GHz, and 6-7 GHz. The bandwidths occupied by multiple transmission links in the same frequency band may be the same or different. For example, the bandwidths occupied by the multiple transmission links may be one or more of 20 MHz, 40 MHz, and 80 MHz. The frequency ranges of the bandwidths occupied by respective transmission frequency bands may belong to the same Wi-Fi working frequency band, or may belong to different Wi-Fi working frequency bands.

The first communication device may send the BA feedback control identifier by carrying the BA feedback control identifier in a management frame, or may send the BA feedback control identifier by sending an instruction. Here, the BA feedback control identifier may be configured to indicate an enabled or disenabled state of BA feedbacks of the transmission links after transmission of the data frames.

As illustrated in FIG. 3, a control identifier can be set in the BA feedback control identifier for each transmission link, and each control identifier corresponds to one transmission link. Here, the transmission link may be any of multiple transmission links for continuous data frames. Link 1 in FIG. 3 represents the control identifier for one transmission link, which is configured to indicate an enabled or disenabled state of BA feedback of the transmission link.

The control identifiers for respective transmission links shown in FIG. 3 may be arranged according to frequency bands of the respective transmission links. For example, Link 1 to Link n may be arranged according to the frequency bands for the corresponding transmission links from high to low, or may be arranged according to the frequency bands for the corresponding transmission links from low to high.

The control identifier for each transmission link in the BA feedback control identifier may occupy one subfield in the BA feedback control identifier, and each subfield may occupy 1 bit, in which "1" or "0" are used to indicate an enabled or disenabled state of the BA feedback for the transmission link. For example, "1" may be used to indicate that the BA feedback for the transmission link is enabled, and "0" may be used to indicate that the BA feedback for the transmission link is disenabled. Alternatively, "0" may be used to indicate that the BA feedback for the transmission link is enabled, and "1" may be used to indicate that the BA feedback for the transmission link is disenabled.

After receiving the message frames, the second communication device may determine the enabled or disenabled state of each transmission link indicated by the first communication device according to the control identifier. The BA feedback is disenabled for the transmission link that is indicated to be disenabled, and the BA feedback is enabled for the transmission link that is indicated to be enabled.

After completing transmission of the continuous data frames, the first communication device may determine the reception of the data frame over each transmission link according to the BA feedback by the second communication device. The first communication device may send the BA feedback control identifier after receiving the BA. For the transmission link that completes data frame transmission and does not require retransmission, the first communication device may disenable the BA feedback for the transmission link, that is, set the control identifier for the transmission link to disenable. For the transmission link that completes the data frame transmission but needs to retransmit the data frames, the first communication device may maintain the BA feedback for the transmission link, that is, set the control identifier for the transmission link to enable. The first communication device may also send the message frame after retransmission of all the transmission links is completed, and set the BA feedbacks for the transmission links for transmitting the data frames to disenabled.

In this way, on one hand, with the BA feedback control identifier, the BA feedback for each transmission link is controlled to enabled or disenabled, and the BA feedback of multiple transmission links whose data transmission is completed can be disenabled, to disenable the active states of the multiple transmission links, thereby reducing the power consumption of the communication device. On the other hand, the an enabled or disenabled state of BA feedbacks for multiple transmission links is realized through one BA feedback control identifier, which reduces the communication conflict problem caused by sending a BA feedback disenabled frame separately for each transmission link, and reduces retransmission of the BA feedback disenabled frame, thereby reducing power consumption caused by retransmission.

In an embodiment, the method for controlling BA feedback further includes:

determining the continuous data frames according to a data frame sequence number indicated by first identification information in the BA feedback control identifier.

The first communication device may transmit multiple sequences of continuous data frames, and after completing the transmission of one sequence of continuous data frames, the first communication device may control the BA feedbacks for the transmission links of the sequence of continuous data frames.

The first communication device may set the first identification information in the BA feedback control identifier to instruct the second communication device to enable or disenable the transmission links of the confirmed continuous data frames. As illustrated in FIG. 4, the first identification information may be a sequence number (SN) of the continuous data frames, that is, an identifier of the continuous data frames. The sequence number of continuous data frames can uniquely identify one sequence of continuous data frames.

The second communication device determines, according to the first identification information, the BA feedback of the continuous data frames that need to be enabled or disenabled. The BA feedback for each transmission link of the continuous data frames is enabled or disenabled according to the control identifier.

In this way, the BA feedbacks for controlling the transmission links can be controlled for different sequences of continuous data frames, and the accuracy of the BA feedback control is improved.

In an embodiment, the method for controlling BA feedback further includes:

determining the continuous data frames according to a TID indicated by second identification information in the BA feedback control identifier.

Each sequence of continuous data frames may also have a unique TID. The first communication device may also set the TID in the message frame, to further indicate the continuous data frames for which the control identifiers indicate the second communication device to enable or disenable.

The second communication device can improve the identification accuracy of the continuous data frames according to the TID and SN.

As illustrated in FIG. 5 and FIG. 6, TID and SN may be set in two subfields, or may be set in one subfield and jointly occupy the bit of the subfield.

In an embodiment, the method for controlling BA feedback further includes: maintaining enabled of the transmission link for an association management frame according to the indication of the BA feedback control identifier.

The association management frame may include an association request frame and an association response frame, and may also include a re-association request frame and a re-association response frame. The second communication device needs to associate with the first communication device when accessing the wireless network. Therefore, it is necessary to maintain the enabled state of the BA feedback for the transmission link for transmitting the association frame, so that the second communication device can associate with the first communication device.

In an embodiment, sending the BA feedback control identifier includes: sending a message frame carrying the BA feedback control identifier.

Here, the BA feedback control identifier may be carried in the message frame for transmission. The message frame may be a management frame, a control frame, or a data frame.

In an embodiment, receiving the BA feedback control identifier for the plurality of transmission links for transmitting the continuous data frames includes: receiving the BA feedback control identifier carried in the last data frame of the continuous data frames.

The last data frame of the continuous data frames may contain data content transmitted as normal, and may also contain the BA feedback control identifier. The last data frame of the continuous data frames may also contain only the BA feedback control identifier.

The BA feedback control identifier in the last data frame of the continuous data frames may be configured to indicate the transmission link whose BA feedback needs to be disenabled after the transmission of the continuous data frames is completed.

After receiving the last data frame of the continuous data frames, the second communication device may determine the transmission link whose BA feedback needs to be disenabled.

Here, the BA feedback for the transmission link that needs to transmit the association frame may remain enabled.

In an embodiment, the method for controlling BA feedback further includes:

sending a BA according to reception of the continuous data frames; and enabling BA feedback for a transmission link indicated by the BA for retransmitting the data frame.

After receiving the continuous data frames, the second communication device may determine the reception of each data frame in the continuous data frames, and send the BA to the first communication device according to the reception of each data frame. Based on the indication in the message frame, the BA feedback is disenabled, and the BA feedback is remained enabled for the transmission link that needs to perform data frame retransmission.

After receiving the BA, the first communication device may first determine the data frame that needs to be retransmitted and the transmission link for retransmitting the data frame, and disenable the transmission link that does not require data frame retransmission, and maintain enabled of the BA feedback for the transmission link that needs to perform data frame retransmission. In this way, the transmission link that performs retransmission can be provided with the ability to receive block reception feedback.

Here, the BA feedback can remain enabled for transmission link that needs to transmit the association frame.

In an embodiment, sending the last data frame of the continuous data frames carrying the acknowledgment feedback control identifier includes:

in response to a number of initially transmitted frames of the continuous data frames being less than a number threshold, sending the last data frame of the continuous data frames carrying the block acknowledgment feedback control identifier.

Here, the number threshold may be determined according to historical transmission records of data frames. The first communication device may count the number of initially-transmitted data frame transmissions when the retransmitted data frame occurs for the first time in the historical transmissions, so as to estimate the number of data frame transmissions when no retransmission occurs under a predetermined probability. This number of data frame transmissions is determined as the number threshold.

When the number of initially-transmitted frames of the continuous data frames is less than the number threshold, the BA feedback control identifier is carried in the last data frame, which can reduce a situation that the transmission link indicated by the BA feedback control identifier to disenabled needs to retransmit the data frame, and improve the accuracy of indication of the BA feedback control identifier.

A specific example is provided below in combination with any of the above embodiments.

After the originator for continuous data frames sends the continuous data frames, it receives the BA fed back by the recipient for the continuous data frames. The BA can be received in two cases. 1. The BA can be received under each transmission link. 2. The BA can be received under one transmission link. The transmission link for receiving the BA may be determined according to the loads of the transmission links, or the transmission link for establishing association may be used as the transmission link for receiving the BA.

According to the feedback of BA, the originator of the data frames can send the multi-link BA disenable frame as shown in FIG. 5 or FIG. 6 if no retransmission occurs or no new continuous data frame transmission occurs in the multiple transmission links of the continuous data frames.

In FIG. 5 or FIG. 6, TID and SN can be used to identify the transmitted continuous data frames. TID ensures the QoS of data frames during transmission, and SN is the sequence number of the continuous data frames. After transmission of the continuous data frames identified by TID/SN is completed, if no retransmission is required, the frame format shown in FIG. 5 or FIG. 6 is used to disenable the BA process of the continuous data frames identified by TID/SN. The link in FIG. 5 or FIG. 6 can be set to "enable" or "disenable". When the transmission link completes all transmissions, it can be set to "enable", and the transmission link for receiving BA can be set to "enable", and the transmission link used to receive the BA is generally the link for establishing association.

A transmission link can send data frames that do not belong to the same TID/SN, and thus there may be multiple TID/SNs in the multi-link BA disenabled frame.

When the continuously transmitted data frames belong to only one TID/SN (without the need of continuous retransmission), and there is no new continuous data frame, the format shown in FIG. 3 is used, in which only the link for establishing association is set to "enable", and other links are set to "disenable".

The above multi-link BA disenabled indication information may be carried in the last frame of the continuous data frames. The originator of the data frames sets a threshold according to the historical statistics of the number of retransmissions. If lower than the threshold, the originator carries the multi-link BA disenabled indication information in the last frame of the continuous data frames. The recipient of the data frames will feedback the BA after confirming the reception of each of the continuous data frames. For example, if 1 is identified in the BA, it is determined that the data frame does not require continuous retransmission. After receiving the BA frame, the originator and recipient of the data frames can disenable the multi-link BA process, and only remain the link that receives the BA frame in an active state. If 2 is identified in the BA, the multi-link BA process is still enabled for the transmission link that needs retransmission. The duration field of the BA frame sent by the recipient can be set to: BA length+SIFS+retransmission duration.

Figure 9:
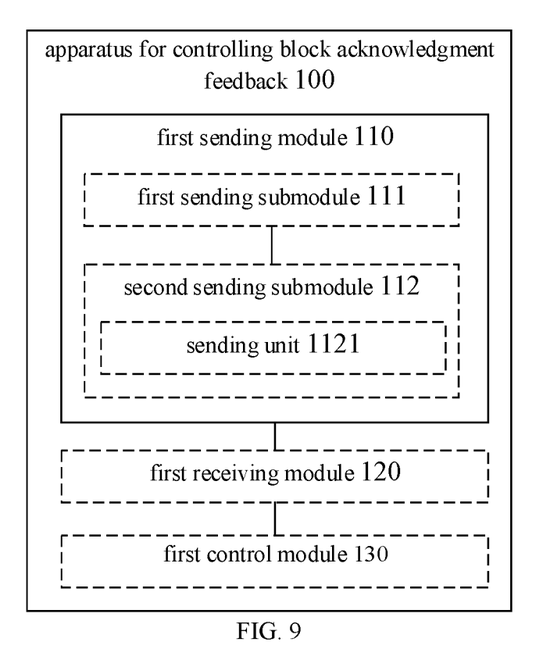
FIG. 9 is a block diagram of an apparatus for controlling BA feedback according to an exemplary embodiment.

Embodiments of the disclosure further provide an apparatus for controlling BA feedback, which is applied to a first communication device in wireless communication. FIG. 9 is a block diagram of an apparatus 100 for controlling BA feedback according to an exemplary embodiment. As illustrated in FIG. 9, the apparatus 100 includes: a first sending module 110.

The first sending module 110 is configured to, for a plurality of transmission links that transmit continuous data frames, send a block acknowledgement feedback control identifier, in which the block acknowledgement feedback control identifier is configured to indicate an enabled or disenabled state of BA feedback of each transmission link.

In an embodiment, the BA feedback control identifier further includes:
  first identification information configured to indicate a data frame sequence number of the continuous data frames.

In an embodiment, the BA feedback control identifier further includes:
  second identification information configured to indicate a TID of the continuous data frames.

In an embodiment,
  the BA feedback control identifier is configured to indicate maintaining enabled of the transmission link for an association management frame.

In an embodiment, the first sending module 110 includes:
  a first sending submodule 111, configured to send a message frame carrying the block acknowledgment feedback control identifier.

In an embodiment, the first sending module 110 includes:
  a second sending submodule 112, configured to send the last data frame of the continuous data frames carrying the block acknowledgment feedback control identifier.

In an embodiment, the apparatus 100 further includes:
  a first receiving module 120, configured to receive a BA based on the continuous data frames; and
  a first control module 130, configured to enable BA feedback for a transmission link indicated by the BA for retransmitting the data frame.

In an embodiment, the second sending submodule 112 includes:
  a sending unit 1121, configured to, in response to a number of initially transmitted frames of the continuous data frames being less than a threshold, send the last data frame of the continuous data frames carrying the block acknowledgment feedback control identifier.

Figure 10:
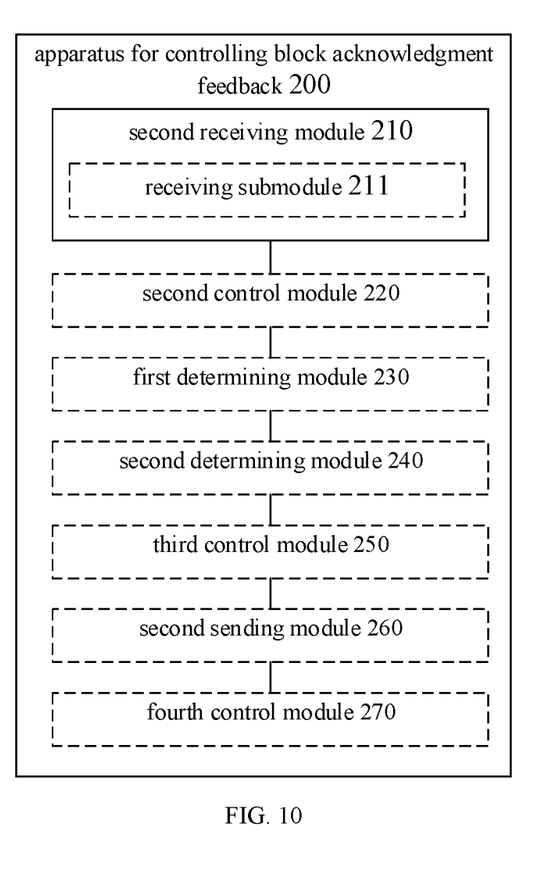
FIG. 10 is another block diagram of an apparatus for controlling BA feedback according to an exemplary embodiment.

Embodiments of the disclosure further provide an apparatus for controlling BA feedback, which is applied to a second communication device in wireless communication. FIG. 10 is a block diagram of an apparatus 200 for controlling BA feedback according to an exemplary embodiment. As illustrated in FIG. 10, the apparatus 200 includes: a second receiving module 210 and a second control module 220.

The second receiving module 210 is configured to receive a block acknowledgement feedback control identifier for a plurality of transmission links that transmit continuous data frames.

The second control module 220 is configured to enable or disenable BA feedback for the transmission link according to indication of the block acknowledgement feedback control identifier.

In an embodiment, the apparatus 200 further includes:
a first determining module 230, configured to determine the continuous data frames according to a data frame sequence number indicated by first identification information in the BA feedback control identifier.

In an embodiment, the apparatus 200 further includes:
a second determining module 240, configured to determine the continuous data frames according to a TID indicated by second identification information in the BA feedback control identifier.

In an embodiment, the apparatus 200 further includes:
a third control module 250, configured to maintain enabled of the transmission link for an association management frame according to the indication of the block acknowledgement feedback control identifier.

In an embodiment, the second receiving module 210 includes:
a receiving submodule 211, configured to receive the BA feedback control identifier carried in the last data frame of the continuous data frames.

In an embodiment, the apparatus 200 further includes:
a second sending module 260, configured to send a BA according to reception of the continuous data frames; and
a fourth control module 270, configured to enable BA feedback for a transmission link indicated by the BA for retransmitting the data frame.

In example embodiments, the first sending module 110, the first receiving module 120, the first control module 130, the second receiving module 210, the second control module 220, the first determining module 230, the second determining module 240, the third control module 250, the second sending module 260 and the fourth control module 270 can be implemented by one or more central processing units (CPUs), a graphics processing unit (GPU), a baseband processor (BP), and an application specific integrated circuit (ASIC), a DSP, a programmable logic device (PLD), a complex programmable logic device (CPLD), a field-programmable gate array (FPGA), a general processor, a controller, a micro controller unit (MCU), a microprocessor, or other electronic components, to implement the above method.

Figure 11:
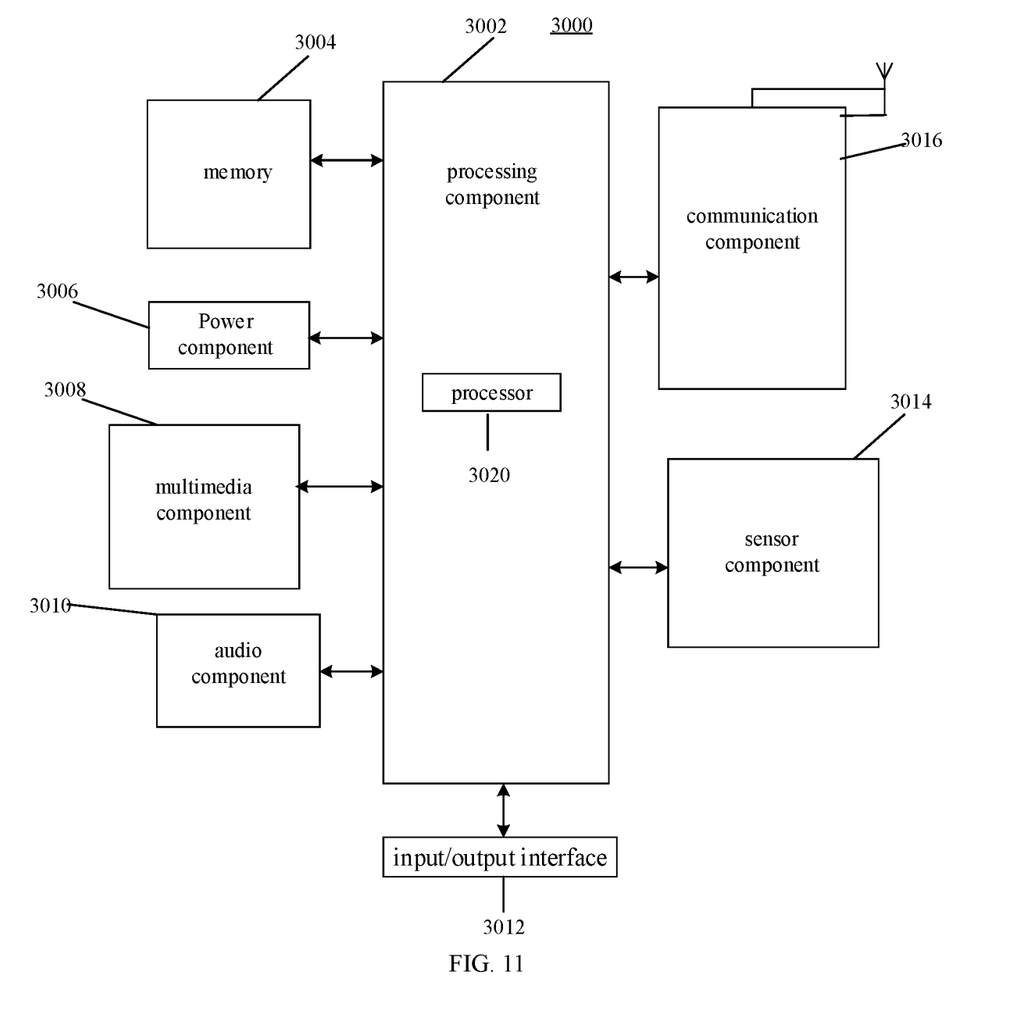
FIG. 11 is a block diagram of an apparatus for controlling BA feedback according to an exemplary embodiment.

FIG. 11 is a block diagram of an apparatus 3000 for controlling BA feedback according to an exemplary embodiment. For example, the apparatus 3000 may be a mobile phone, a computer, a digital broadcasting terminal, a message transceiver device, a game console, a tablet device, a medical device, a fitness device and a personal digital assistant.

As illustrated in FIG. 11, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the apparatus 3000, such as the operations associated with display, telephone calls, data communications, camera operations, and recording operations. The processing component 3002 may include one or more processors 3020 to execute instructions to perform all or part of the steps in the above described method. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the apparatus 3000. Examples of such data include instructions for any applications or methods operated on the apparatus 3000, contact data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the apparatus 3000. The power component 3006 may include a power management system, one or more power sources, and any other components associated with the generation, management, and distribution of power in the apparatus 3000.

The multimedia component 3008 includes a screen providing an output interface between the apparatus 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front-facing camera and/or a rear-facing camera. When the apparatus 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the apparatus 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the apparatus 3000. For instance, the sensor component 3014 may detect an open/closed status of the apparatus 3000, relative positioning of components, e.g., the display and the keypad, of the apparatus 3000, a change in position of the apparatus 3000 or a component of the apparatus 3000, a presence or absence of user contact with the apparatus 3000, an orientation or an acceleration/deceleration of the apparatus 3000, and a change in temperature of the apparatus 3000. The sensor component 3014 may include a proximity sensor configured to detect the presence of nearby objects without any physical contact. The sensor component 3014 may also include a light sensor, such as a CMOS or CCD image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the apparatus 3000 and other devices. The apparatus 3000 can access a wireless network based on a communication standard, such as WiFi, 2G, or 3G, or a combination thereof. In an exemplary embodiment, the communication component 3016 receives a broadcast signal or broadcast associated information from an external broadcast management system via a broadcast channel. In an exemplary embodiment, the communication component 3016 further includes a near field communication (NFC) module to facilitate short-range communication. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 3004, executable by the processor 3020 in the apparatus 3000, for performing the above method. For example, non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling block acknowledgment feedback, performed by a first communication device, comprising:
for a plurality of transmission links that transmit continuous data frames, sending a block acknowledgement feedback control identifier, wherein the block acknowledgement feedback control identifier is configured to indicate an enabled or disenabled state of block acknowledgment feedback of each transmission link;
wherein sending the block acknowledgment feedback control identifier comprises:
in response to a number of initially transmitted frames of the continuous data frames being less than a number threshold, sending a last data frame of the continuous data frames carrying the block acknowledgment feedback control identifier.

2. The method of claim 1, wherein the block acknowledgment feedback control identifier further comprises:
first identification information configured to indicate a data frame sequence number of the continuous data frames.

3. The method of claim 1, wherein the block acknowledgment feedback control identifier further comprises:
second identification information configured to indicate a traffic identifier (TID) of the continuous data frames.

4. The method of claim 1, wherein,
the block acknowledgment feedback control identifier is configured to indicate maintaining enabled of a transmission link for an association management frame.

5. The method of claim 1, wherein sending the block acknowledgment feedback control identifier comprises:
sending a message frame carrying the block acknowledgment feedback control identifier.

6. The method of claim 1, further comprising:
receiving a block acknowledgment (BA) based on the continuous data frames; and
enabling BA feedback for a transmission link requiring data frame retransmission, wherein the transmission link requiring data frame retransmission is indicated by the BA.

7. A method for controlling block acknowledgment feedback, performed by a second communication device, comprising:
receiving a block acknowledgement feedback control identifier for a plurality of transmission links that transmit continuous data frames; and
enabling or disenabling block acknowledgment feedback for the transmission link according to indication of the block acknowledgement feedback control identifier;
wherein receiving the block acknowledgement feedback control identifier for a plurality of transmission links that transmit the continuous data frames comprises:
receiving the block acknowledgment feedback control identifier carried in a last data frame of the continuous data frames; wherein the last data frame is sent by a first communication device in response to a number of initially transmitted frames of the continuous data frames being less than a number threshold.

8. The method of claim 7, further comprising:
determining the continuous data frames according to a data frame sequence number indicated by first identification information in the block acknowledgment feedback control identifier.

9. The method of claim 7, further comprising:
determining the continuous data frames according to a traffic identifier (TID) indicated by second identification information in the block acknowledgment feedback control identifier.

10. The method of claim 7, further comprising:
maintaining enabled of a transmission link for an association management frame according to the indication of the block acknowledgement feedback control identifier.

11. The method of claim 7, wherein receiving the block acknowledgement feedback control identifier for a plurality of transmission links that transmit continuous data frames comprises: receiving the block acknowledgment feedback control identifier carried in a last data frame of the continuous data frames.

12. The method of claim 11, further comprising:
sending a block acknowledgment (BA) according to reception of the continuous data frames; and
enabling BA feedback for a transmission link requiring data frame retransmission, wherein the transmission link requiring data frame retransmission is indicated by the BA.

13. A communication device, comprising a processor, a transceiver, a memory, and executable programs stored on the memory and capable of being executed by the processor, wherein when the executable programs are executed by the processor, steps of the method for controlling block acknowledgment feedback according to claim 7 are implemented.

14. A communication device comprising a processor, a transceiver, a memory, and executable programs stored on the memory and capable of being executed by the processor, wherein when the executable programs are executed by the processor, the processor is configured to:
for a plurality of transmission links that transmit continuous data frames, send a block acknowledgement feedback control identifier, wherein the block acknowledgement feedback control identifier is configured to indicate an enabled or disenabled state of block acknowledgment feedback of each transmission link;
wherein when sends the block acknowledgment feedback control identifier, the processor is configured to:
in response to a number of initially transmitted frames of the continuous data frames being less than a number threshold, send a last data frame of the continuous data frames carrying the block acknowledgment feedback control identifier.

15. The communication device of claim 14, wherein the block acknowledgment feedback control identifier further comprises at least of:
first identification information configured to indicate a data frame sequence number of the continuous data frames; or
second identification information configured to indicate a traffic identifier (TID) of the continuous data frames.

16. The communication device of claim 14, wherein, the block acknowledgment feedback control identifier is configured to indicate maintaining enabled of a transmission link for an association management frame.

17. The communication device of claim 14, wherein the processor is further configured to:
receive a block acknowledgment (BA) based on the continuous data frames; and
enable BA feedback for a transmission link requiring data frame retransmission, wherein the transmission link requiring data frame retransmission is indicated by the BA.

* * * * *